J. F. FENTON.
KNOCKDOWN HOLDUP FRUSTRATOR FOR AUTOMOBILES.
APPLICATION FILED MAY 29, 1922.
1,433,708.
Patented Oct. 31, 1922.
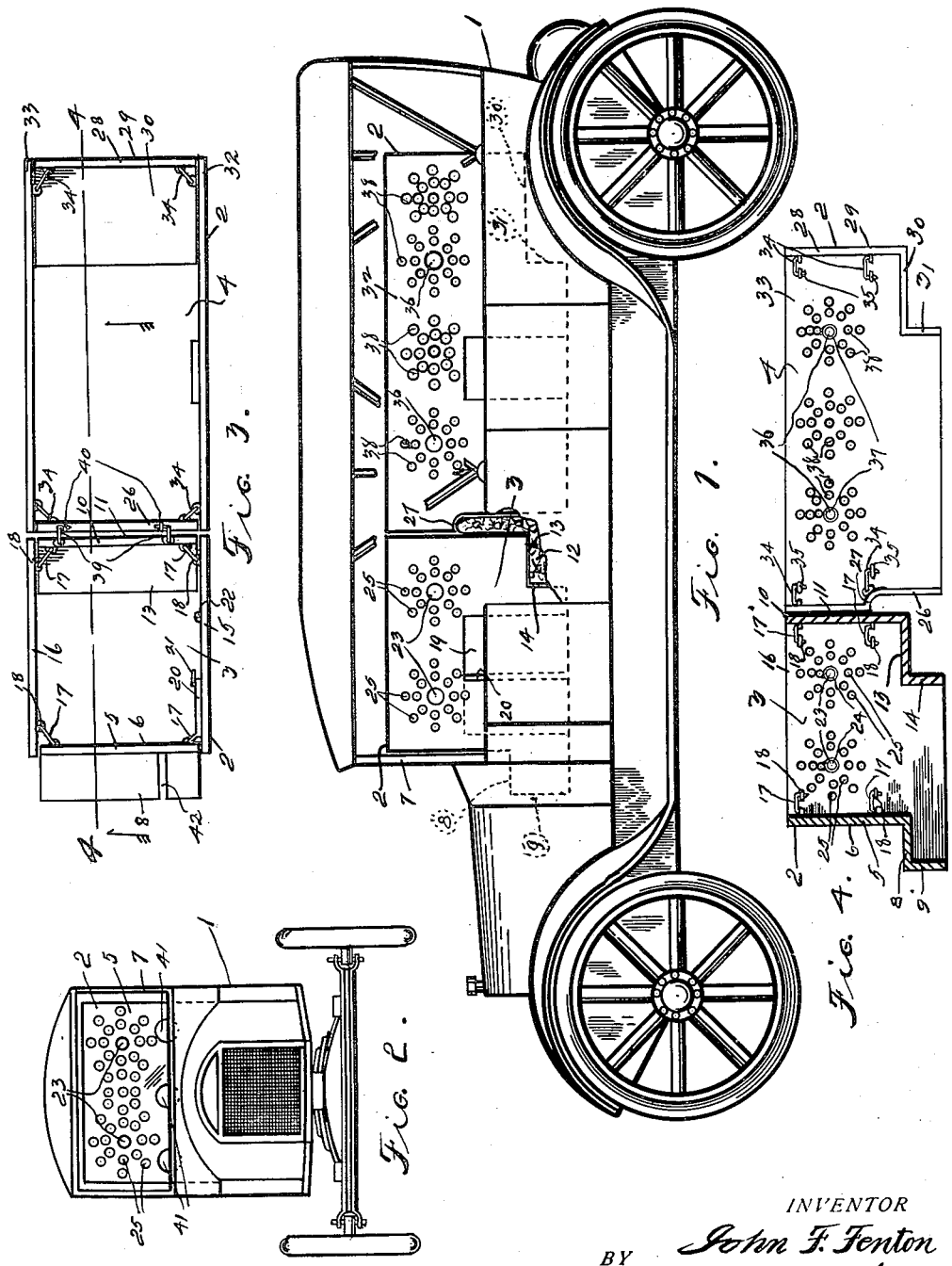
INVENTOR
John F. Fenton
BY
M. E. Gillham
ATTORNEY Patented Oct. 31, 1922.

1,433,708

UNITED STATES PATENT OFFICE.

JOHN F. FENTON, OF BETHEL, KANSAS.

KNOCKDOWN HOLDUP FRUSTRATOR FOR AUTOMOBILES.

Application filed May 29, 1922. Serial No. 564,666.

*To all whom it may concern:*

Be it known that I, JOHN F. FENTON, a citizen of the United States, residing at Bethel, in the county of Wyandotte and State of Kansas, have invented a new and useful Knockdown Holdup Frustrator for Automobiles, of which the following is a specification.

My invention relates to knock-down holdup frustrators, and the object of the invention is to provide a portable device of this character which may be quickly assembled and installed in the body of an automobile to provide protection to the occupants of the car and valuables committed to their care and being transported by them against the attacks of robbers.

I attain these objects by means of the combination and association of parts illustrated in the accompanying drawing in which—
Figure 1, is a side elevation of an automobile equipped with a barricade embodying my invention. Figure 2, is a front elevation of the same. Figure 3, is a top plan view of the barricade device apart from the automobile and, Figure 4, is a longitudinal section of the device, on the line 4—4, in Figure 3.

Similar numerals of reference refer to corresponding parts throughout the several views.

Referring to the drawings—the numeral 1, designates a touring model automobile, in the body of which is mounted a barricade device 2, constructed in accordance with the invention. The barricade consists of two compartments 3 and 4, the former compartment being adapted for the protection of the occupants of the front seat and the latter compartment for the protection of the occupants of the rear seat. The compartment 3, has a front member 5, which is formed with a vertical upper portion 6, which is disposed at the rear of the wind shield 7, a horizontal portion 8, which is adapted for extending forward below the instrument board a suitable distance and then terminating in an apron portion 9. The compartment has, also, a back member 10, which is formed to have a vertical portion 11, to extend across the body at the front side of the back of the seat 12, also a horizontal portion 13, which is adapted for bearing on the upper side of the seat and then terminating in an apron portion 14, which is aligned with the apron 9, on the front member. Plane side members 15 and 16, having their ends cut away to conform with the ends of the front and back members are connected with the said members by hooks 17, which are mounted on the inner sides of the front and rear members, which hooks are arranged to enter eyes 18, which are mounted on the inner side of the side members to, thereby, hold the members assembled to form a hollow square barricade. In the one side member is a door opening 19, to permit ingress and egress to and from the barricade, which opening is arranged to be closed by a door 20, which is slidably mounted on the inner side of the side member, the door being held to close the opening by a hook 21, which is mounted on the inner side of the door and arranged thereon to enter an eye 22, on the inner side of the side member. In the front and back members and, also, in the side members, are port holes 23, which are normally closed by gravity operable shields 24, which are pivotally mounted on the inner sides of the members. About the port holes are a plurality of laminated glass eyes 25, which provide full opportunity for the occupants of the car to look therethrough and see the outside surroundings. The compartment 4, also, has a front member 26, which is inset a suitable distance, as shown at 27, in Figures 1 and 4, so that it will have a bearing on the upper edge of the back of the front seat and, also, bear on the back member of the compartment 3. The compartment, also, has a back member 28, similar to the back member of the compartment 3, and having a vertical portion 29, a horizontal portion 30, and an apron portion 31. Side members 32 and 33, having their respective ends cut away to conform to the ends of the front and back members, are connected with the front and back members, by hooks 34, which are mounted on the inner sides of the front and back members and arranged to enter eyes 35, which are mounted on the inner sides of the side members to receive them, to thereby hold the members operatively assembled to form the compartment. In all the members are port holes 36, which are normally closed by shields 37, which are pivotally mounted on the inner sides of the members. About the port holes are provided a plurality of laminated glass eyes 38, to afford opportunity for the occupants of the car to look therethrough and observe the surroundings. Hooks 39, are mounted on the compartment 3, and are arranged to engage the eyes 40, which are mounted on the compartment 4, to thereby hold the two compartments together. In the front members of the two compartments are openings 41, which are provided for observing the instruments on the instrument board. In cases where the steering wheel post is in the way of properly installing the front member, the apron portion thereof as well as the horizontal portion may be slotted to receive the post, as is shown in Figure 3, at 42.

If valuables or money are to be transported, or pursuit of robbers is intended, the frustrator may be quickly installed in the customary touring car in a short time. The compartments are installed by setting to place the front and back members and then setting the side members in place, securing the same in operative position by means of the hooks and eyes provided for the purpose. The horizontal portions of the back members provide facility for seating the members upon the respective seats, thereby holding the compartments in fairly rigid position when the parts are assembled.

When the occupants are ready to start, the door is closed and hooked from the inside, the door opening permitting persons to enter and leave the car after the compartments are erected.

There is no top or closure for the compartments, for the reason that the occupants of the car may rise and view the outside, moreover, they may fire guns at fleeing robbers while in a standing position.

In a car equipped with my invention and occupied by armed guards, if attacked by robbers, the guards are able to continually keep the bandits in sight by looking through the glass eyes, of which there are a plentiful supply to form a liberal screen. If the firing of guns becomes necessary, the guards may turn the shields over the port holes and thrust their guns through the port holes and be able to shoot with effect without being themselves in any danger.

Having described my invention what I claim is—

A knock-down hold-up frustrator for automobiles, consisting of a portable barricade comprising a transversely extending front member adapted for erection in the front of the automobile body and having a plurality of gun port holes therethrough and a plurality of glass eyes therein arranged about the port holes and forming a transparent screen, a transversely extending back member adapted to conform to the automobile seat and having a plurality of gun port holes therethrough and a plurality of glass eyes therein arranged about the port holes and forming a transparent screen, oppositely disposed side members detachably secured to said front and said back members, said side members having a plurality of gun port holes therethrough and a plurality of glass eyes therein arranged about the port holes and forming a transparent screen, and shields pivotally mounted on the inner sides of said members and operable by gravity to hold the port holes normally closed.

Kansas City, Mo., May 18th, 1922.

JOHN F. FENTON.

Witnesses:
 PAUL E. BINDLEY,
 BEN S. SOLOMON.